(12) United States Patent
Basso et al.

(10) Patent No.: US 7,715,428 B2
(45) Date of Patent: May 11, 2010

(54) MULTICORE COMMUNICATION PROCESSING

(75) Inventors: Claude Basso, Raleigh, NC (US); Jean L. Calvignac, Raleigh, NC (US); Chih-jen Chang, Apex, NC (US); Philippe Damon, Chapel Hill, NC (US); Herman D. Dierks, Jr., Round Rock, TX (US); Christoph Raisch, Gerlingen (DE); Jan-Bernd Themann, Tübingen (DE); Natarajan Vaidhyanathan, Carrboro, NC (US); Fabrice J. Verplanken, LaGaude (FR); Colin B. Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 11/669,419

(22) Filed: Jan. 31, 2007

(65) Prior Publication Data

US 2008/0181245 A1    Jul. 31, 2008

(51) Int. Cl.
*H04L 12/66* (2006.01)
*H04J 3/16* (2006.01)
*H04J 3/22* (2006.01)

(52) U.S. Cl. ..................... 370/463; 370/469
(58) Field of Classification Search ............... 370/463, 370/469
See application file for complete search history.

(56) References Cited

U.S. PATENT DOCUMENTS

| | | | |
|---|---|---|---|
| 6,075,791 A | 6/2000 | Chiussi et al. | |
| 6,721,806 B2 | 4/2004 | Boyd et al. | |
| 7,010,633 B2 | 3/2006 | Arndt et al. | |
| 7,324,540 B2 * | 1/2008 | Vangal et al. | 370/419 |
| 2005/0141434 A1 * | 6/2005 | Cornett | 370/252 |
| 2006/0034310 A1 | 2/2006 | Connor | |

(Continued)

FOREIGN PATENT DOCUMENTS

WO   WO 2007/117916 A1   10/2007

(Continued)

OTHER PUBLICATIONS

"Introduction to Receive-Side Scaling", Microsoft Corporation, 2006, http://msdn2.microsoft.com/en-gb/library/ms795616(d=printer).aspx, 3 pages.

(Continued)

*Primary Examiner*—Ayaz R Sheikh
*Assistant Examiner*—Blanche Wong
(74) *Attorney, Agent, or Firm*—Stephen J. Walder, Jr.; Diana R. Gerhardt

(57) ABSTRACT

Mechanisms for processing of communications between data processing devices are provided. With the mechanisms of the illustrative embodiments, a set of techniques that enables sustaining media speed by distributing transmit and receive-side processing over multiple processing cores is provided. In addition, these techniques also enable designing multi-threaded network interface controller (NIC) hardware that efficiently hides the latency of direct memory access (DMA) operations associated with data packet transfers over an input/output (I/O) bus. Multiple processing cores may operate concurrently using separate instances of a communication protocol stack and device drivers to process data packets for transmission with separate hardware implemented send queue managers in a network adapter processing these data packets for transmission. Multiple hardware receive packet processors in the network adapter may be used, along with a flow classification engine, to route received data packets to appropriate receive queues and processing cores for processing.

35 Claims, 7 Drawing Sheets

U.S. PATENT DOCUMENTS

| | | |
|---|---|---|
| 2006/0221951 A1 | 10/2006 | Basso et al. |
| 2006/0221952 A1 | 10/2006 | Basso et al. |
| 2006/0221953 A1 | 10/2006 | Basso et al. |
| 2006/0221961 A1 | 10/2006 | Basso et al. |
| 2006/0221966 A1 | 10/2006 | Basso et al. |
| 2006/0221969 A1 | 10/2006 | Basso et al. |
| 2006/0221977 A1 | 10/2006 | Basso et al. |
| 2006/0221989 A1 | 10/2006 | Basso et al. |
| 2006/0222002 A1 | 10/2006 | Basso et al. |
| 2006/0251120 A1 | 11/2006 | Arimilli et al. |

OTHER PUBLICATIONS

"Scalable Networking: Eliminating the Receive Processing Bottleneck-Introducing RSS", Windows Hardware and Driver Central (WinHEC) 2004 Version, Microsoft Corporation, Apr. 14, 2004, http://www.microsoft.com/whdc/, pp. 1-17.

* cited by examiner

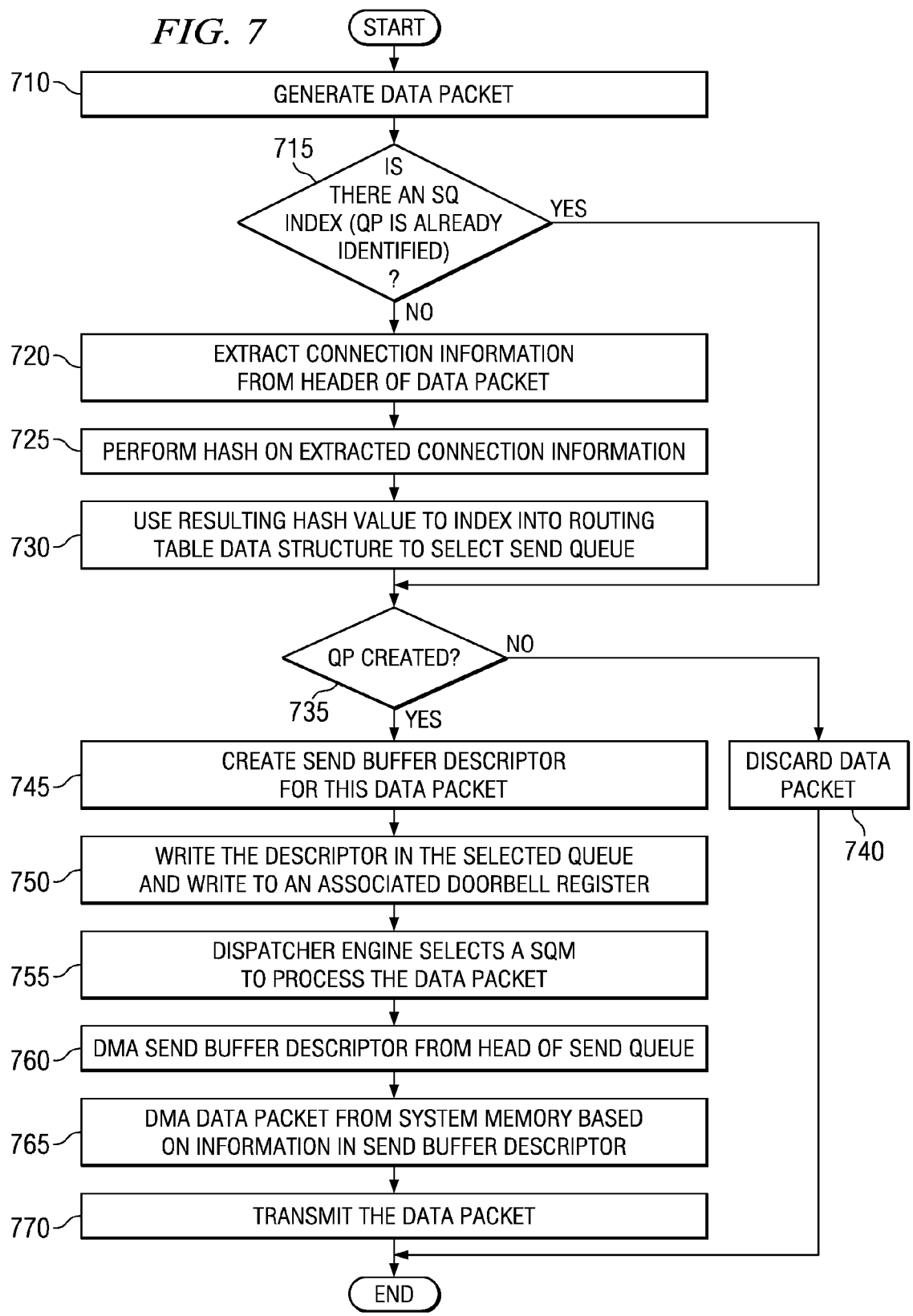

MULTICORE COMMUNICATION PROCESSING

BACKGROUND

1. Technical Field

The present application relates generally to an improved data processing system and method. More specifically, the present application is directed to a system and method for multicore communication processing.

2. Description of Related Art

With modern computing systems, in which high speed networking is becoming a requirement, multiple processing cores, i.e. processors, typically reside within a single system. Although multiple processing cores may be provided, typically the processing of data packets in such high speed networking is limited to single processor cores handling the receive-side and send-side operations.

Regarding the receive-side processing of high speed networking mechanisms, a single processor or core typically performs receive interrupt handling. With regard to send-side processing, known systems typically serialize, on a single processor or core, the transmit portion of the send-side processing in a network device driver. A plurality of processors may be trying to send data on a plurality of connections, but these operations will be serialized once in the device driver.

Using a single core to handle communication processing results in a communication bottleneck. As the speed of communications increase, e.g., at 10 Gbps, the processing overhead of the communication stack, e.g., the TCP/IP stack, makes using a single processing core to handle the communication processing impossible. That is, a single processing core cannot sustain the media speed bandwidth, i.e. to utilize the full communication link capacity.

One solution proffered by Microsoft Corporation is referred to as Receive-Side Scaling (RSS) and is described, for example, in "Scalable Networking: Eliminating the Receive Processing Bottleneck-Introducing RSS," WinHEC 2004 Version, Apr. 14, 2004. The RSS solution involves using a hash function and indirection table to distribute data packets across a plurality of processors for processing. A hash is generated based on the received data packet and the least significant bits of the resulting hash value are used to index into an indirection table. The indirection table stores entries for directing the data packet to one of a plurality of processors. The data packet is then processed by the selected processor.

The RSS solution helps to distribute receive-side processing of communication packets. However, RSS does not provide any mechanisms for enhancing the send-side processing of communication packets. To the contrary, RSS relies entirely on the passive effects of increasing the receive-side processing throughput to permit send-side processing speed to increase.

SUMMARY

The illustrative embodiments provide a system and method for multicore processing of communications between data processing devices, referred to herein as multicore scaling (MCS). With the mechanisms of the illustrative embodiments, MCS is provided as a set of techniques that enables sustaining media speed by distributing transmit and receive-side processing over multiple processing cores. These techniques also enable designing multi-threaded network interface controller (NIC) hardware that efficiently hides the latency of direct memory access (DMA) operations associated with data packet transfers over an input/output (I/O) bus.

MCS, in accordance with the mechanisms of the illustrative embodiments, delivers a media speed communication protocol, e.g., TCP/IP processing, by enabling parallel packet processing at two critical levels: a software level (e.g., TCP/IP stack level), and a hardware level (e.g., NIC level). The basic concept is based on the fact that a communication link carries flows (i.e. connections) that are largely independent of each other. Therefore, these flows, coming from or going to a single physical or virtual port, can be processed in parallel on multiple processing cores. At the NIC level, multithreading allows packets belonging to different flows to be concurrently processed by different hardware threads.

On the receive side, flow identification may be performed in the NIC at a level just on top of the Media Access Control (MAC) layer in the communication protocol stack. Each flow may then be processed concurrently by different hardware threads inside the NIC and directed to different processing cores using queues and interrupts dedicated to each flow. On the transmit side, the flow identification may be performed by software, e.g., the communication protocol stack and/or device driver. Each flow is associated with a dedicated send queue and each send queue may be processed by a different hardware thread inside the NIC.

With the mechanisms of the illustrative embodiments, the NIC is provided with a plurality of send queue managers (SQMs), which are hardware elements that process packets submitted to associated send queues for transmission by the NIC. The processing cores of the host system place packets into associated send queues from which the SQMs process the data packets, using direct memory access (DMA) operations, and transmit the data packets via an associated physical or virtual port.

The NIC further is provided with a plurality of receive packet processors (RPPs), provided in hardware, for processing packets received via an associated physical or virtual port. The RPPs work in concert with a hardware implemented flow classifier engine that operates to separate out data flows arriving via the same physical or virtual port. Based on the classification performed by the flow classifier engine, a receive queue is selected. At any given time, a scheduler engine may choose a RPP to be used with a given receive queue and the scheduler engine will then make sure that there are no two RPPs working on the same receive queue at the same time. The data packets are provided to one of the RPPs which process the packets for the selected receive queue. Either an interrupt or polling technique may be used to inform a processor associated with the receive queue that a new data packet has arrived for processing.

The processing cores run software for handling send and receive queue utilization for transmitting and receiving data packets. This software operates at the communication protocol stack level and may be implemented either as part of the communication protocol stack or as a separate device driver, for example. In one illustrative embodiment, the software is implemented as a NIC device driver that operates without requiring any change in the TCP/IP stack.

On the receive-side processing, the software may operate in response to the generation of an interrupt indicating receipt of a data packet and may serve to deliver the received data packet to the communication protocol stack, e.g., the TCP/IP stack, for processing. On the send side processing, the software may operate to select a send queue to which data packets are to be sent and queues the data packets in the selected send queue. The software may then set a doorbell associated with the send queue to thereby notify the NIC that the data packet is ready to be sent.

Both the send and receive-side processing performed by the software mechanisms may be performed in parallel with each other and with other send and receive-side processing performed by other instances of the software running on other processing cores. Locks are not required for such processing except in the instance that the TCP/IP stack needs to access a send queue since multiple TCP/IP instances may work on connections that are part of the same data flow, i.e. multiple TCP/IP stacks may need to access the same send queue and hence, locking may be required.

Thus, the MCS mechanisms of the illustrative embodiments provide high performance by enabling concurrent processing on both the transmit and receive sides of a communication flow. Moreover, the MCS mechanisms enable high performance by enabling concurrent processing on NIC and processing cores. Furthermore, the MCS mechanisms enable high performance by creating an affinity between flows and processor caches. All of these benefits make the MCS mechanisms of the illustrative embodiments well suited for high speed media applications, including high speed media bandwidths of 10 Gbps and above, such that full communication link capacity may be utilized.

In one illustrative embodiment, a method for transmitting a data packet is provided. The method may comprise generating, in a processing core, a data packet for transmission to an external device and selecting a send queue to use for transmitting the data packet based on connection information extracted from a header of the data packet. The method may further comprise generating an entry in the selected send queue for the data packet and processing the entry in the selected send queue by an associated hardware implemented send queue manager of a network adapter to thereby transmit the data packet to an external device. The associated hardware implemented send queue manager may be one of a plurality of hardware implemented send queue managers provided in the network adapter. Each hardware implemented send queue manager of the plurality of hardware implemented send queue managers may be associated with a different send queue.

The processing core may be one of a plurality of processing cores. The method may be implemented with regard to each of the plurality of processing cores in a substantially parallel manner.

Selecting a send queue to use for transmitting the data packet may comprise retrieving send buffer descriptor information from system memory and determining, based on the connection information and the send buffer descriptor information, whether a send queue has been previously allocated for a connection associated with the data packet. Selecting the send queue may further comprise selecting the previously allocated send queue if a send queue has been previously allocated for the connection. If a send queue has not been previously allocated for the connection, the method may comprise performing a hash operation on the connection information to generate a hash value, indexing into a routing table data structure based on the generated hash value, and selecting a send queue based on a value of an entry stored in the routing table data structure associated with the hash value.

Selecting a send queue to use for transmitting the data packet and generating an entry in the selected send queue for the data packet may be performed by software executing on the processing core. The software may be a network interface device driver separate from a communication protocol stack. Alternatively, the software may be a portion of a communication protocol stack.

The method may further comprise receiving an incoming data packet in a network interface of the data processing system and processing the incoming data packet using a hardware implemented data flow classifier engine to select a receive queue in which to place the incoming data packet. Moreover, the method may comprise placing, by a hardware implemented receive packet processor, the incoming data packet in a selected receive queue based on the selection performed by the data flow classifier engine.

The data flow classifier engine may select a receive queue by determining if a receive queue for a connection over which the incoming data packet was received has been previously allocated and selecting the previously allocated receive queue if a receive queue has been previously allocated for the connection. If a receive queue for the connection has not been previously allocated, the data flow classifier engine may extract connection information from the incoming data packet, perform a hash operation on the extracted connection information to generate a hash value, and index into a routing table to select a receive queue to which the incoming data packet is to be routed based on the generated hash value.

The receive packet processor may be one of a plurality of receive packet processors. The receive packet processor may be selected from the plurality of receive packet processors by a scheduler engine based on an availability of receive packet processors in the plurality of receive packet processors.

The method may further comprise sending an interrupt to a processing core associated with the selected receive queue and posting a completion event entry in a receive completion queue associated with the selected receive queue. Moreover, the method may comprise processing, by a communication protocol stack, the incoming data packet placed in the selected receive queue.

In another illustrative embodiment, an apparatus is provided that comprises at least one processing core and a network adapter coupled to the at least one processing core. The at least one processing core may generate a data packet for transmission to an external device, select a send queue to use for transmitting the data packet based on connection information extracted from a header of the data packet, and generate an entry in the selected send queue for the data packet. The entry in the selected send queue may be processed by an associated hardware implemented send queue manager of the network adapter to thereby transmit the data packet to an external device. The associated hardware implemented send queue manager may be one of a plurality of hardware implemented send queue managers provided in the network adapter. Each hardware implemented send queue manager of the plurality of hardware implemented send queue managers may be associated with a different send queue.

The at least one processing core may be one of a plurality of processing cores. Each of the plurality of processing cores may perform one or more of the generate and select operations in a substantially parallel manner.

The at least one processing core may select a send queue to use for transmitting the data packet by retrieving send buffer descriptor information from system memory, determining, based on the connection information and the send buffer descriptor information, whether a send queue has been previously allocated for a connection associated with the data packet, and selecting the previously allocated send queue if a send queue has been previously allocated for the connection. If a send queue has not been previously allocated for the connection, the at least one processing core may select a send queue by performing a hash operation on the connection information to generate a hash value, indexing into a routing table data structure based on the generated hash value, and selecting a send queue based on a value of an entry stored in the routing table data structure associated with the hash value.

The at least one processing core may select a send queue to use for transmitting the data packet and generate an entry in the selected send queue for the data packet by executing software in the at least one processing core. The software may be a network interface device driver separate from a communication protocol stack. Alternatively, the software may be a portion of a communication protocol stack.

The network adapter may receive an incoming data packet in a network interface of the data processing system and process the incoming data packet using a hardware implemented data flow classifier engine to select a receive queue in which to place the incoming data packet. The network adapter may further place, by a hardware implemented receive packet processor, the incoming data packet in a selected receive queue based on the selection performed by the data flow classifier engine.

The data flow classifier engine may select a receive queue by determining if a receive queue for a connection over which the incoming data packet was received has been previously allocated and selecting the previously allocated receive queue if a receive queue has been previously allocated for the connection. If a receive queue for the connection has not been previously allocated, the data flow classifier engine may extract connection information from the incoming data packet, perform a hash operation on the extracted connection information to generate a hash value, and index into a routing table to select a receive queue to which the incoming data packet is to be routed based on the generated hash value.

The receive packet processor may be one of a plurality of receive packet processors. The receive packet processor may be selected from the plurality of receive packet processors by a scheduler engine based on an availability of receive packet processors in the plurality of receive packet processors.

The receive packet processor may send an interrupt to a processing core associated with the selected receive queue. The receive packet processor may further post a completion event entry in a receive completion queue associated with the selected receive queue. A communication protocol stack of the at least one processing core may process the incoming data packet placed in the selected receive queue.

In yet another illustrative embodiment, a system is provided that includes a plurality of processing cores and a network adapter. Each processing core in the plurality of processing cores may execute a communication protocol stack instance and a network interface device driver instance. The network adapter may comprise a plurality of hardware implemented send queue managers and a plurality of hardware implemented receive packet processors. The plurality of hardware implemented send queue managers may process data packets placed in send queues by the plurality of processing cores. The plurality of hardware implemented receive packet processors may process data packets received by the network adapter via a port of the network adapter.

Each processing core in the plurality of processing cores may perform the following operations, in a substantially parallel manner, for corresponding data packets each processing core transmits to an external device: generating the data packet for transmission to an external device; selecting a send queue to use for transmitting the data packet based on connection information extracted from a header of the data packet; and generating an entry in the selected send queue for the data packet.

The network adapter may process the entry in the selected send queue by an associated hardware implemented send queue manager to thereby transmit the data packet to the external device. The associated hardware implemented send queue manager may be one of the plurality of hardware implemented send queue managers. Each hardware implemented send queue manager of the plurality of hardware implemented send queue managers may be associated with a different send queue.

Each processing core may select a send queue to use for transmitting the data packet by retrieving send buffer descriptor information from system memory, determining, based on the connection information and the send buffer descriptor information, whether a send queue has been previously allocated for a connection associated with the data packet, and selecting the previously allocated send queue if a send queue has been previously allocated for the connection. If a send queue has not been previously allocated for the connection, each processing core may perform a hash operation on the connection information to generate a hash value, index into a routing table data structure based on the generated hash value, and select a send queue based on a value of an entry stored in the routing table data structure associated with the hash value.

The network adapter may receive an incoming data packet in a network interface of the data processing system, process the incoming data packet using the hardware implemented data flow classifier engine to select a receive queue in which to place the incoming data packet, and place, by a hardware implemented receive packet processor of the plurality of receive packet processors, the incoming data packet in a selected receive queue based on the selection performed by the data flow classifier engine.

The data flow classifier engine may select a receive queue by determining if a receive queue for a connection over which the incoming data packet was received has been previously allocated and selecting the previously allocated receive queue if a receive queue has been previously allocated for the connection. If a receive queue for the connection has not been previously allocated, the data flow classifier engine may extract connection information from the incoming data packet, perform a hash operation on the extracted connection information to generate a hash value, and index into a routing table to select a receive queue to which the incoming data packet is to be routed based on the generated hash value. The receive packet processor may be selected from the plurality of receive packet processors by a scheduler engine of the network adapter based on an availability of receive packet processors in the plurality of receive packet processors.

The receive packet processor may send an interrupt to a processing core associated with the selected receive queue and post a completion event entry in a receive completion queue associated with the selected receive queue. A communication protocol stack instance of a corresponding processing core may process the incoming data packet placed in the selected receive queue.

In still another illustrative embodiment, a computer program product comprising a computer useable medium having a computer readable program is provided. The computer readable program, when executed on a computing device, causes the computing device to generate, in a processing core, a data packet for transmission to an external device and select a send queue to use for transmitting the data packet based on connection information extracted from a header of the data packet. The computer readable program may further cause the computing device to generate an entry in the selected send queue for the data packet and process the entry in the selected send queue by an associated hardware implemented send queue manager of a network adapter to thereby transmit the data packet to an external device. The associated hardware implemented send queue manager may be one of a plurality of hardware implemented send queue managers provided in the network adapter. Each hardware implemented send queue manager of the plurality of hardware implemented send queue managers may be associated with a different send queue.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 is a flowchart outlining an exemplary operation for transmitting or sending data packets in accordance with one illustrative embodiment.

DETAILED DESCRIPTION OF THE ILLUSTRATIVE EMBODIMENTS

Figure 1:
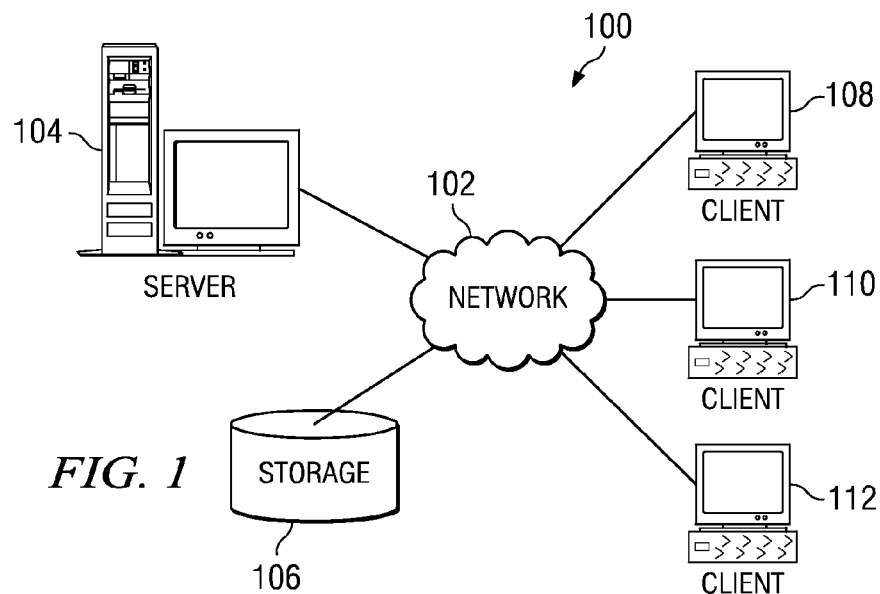
FIG. 1 is an exemplary block diagram of a distributed data processing system in which exemplary aspects of the illustrative embodiments may be implemented.
Figure 2:
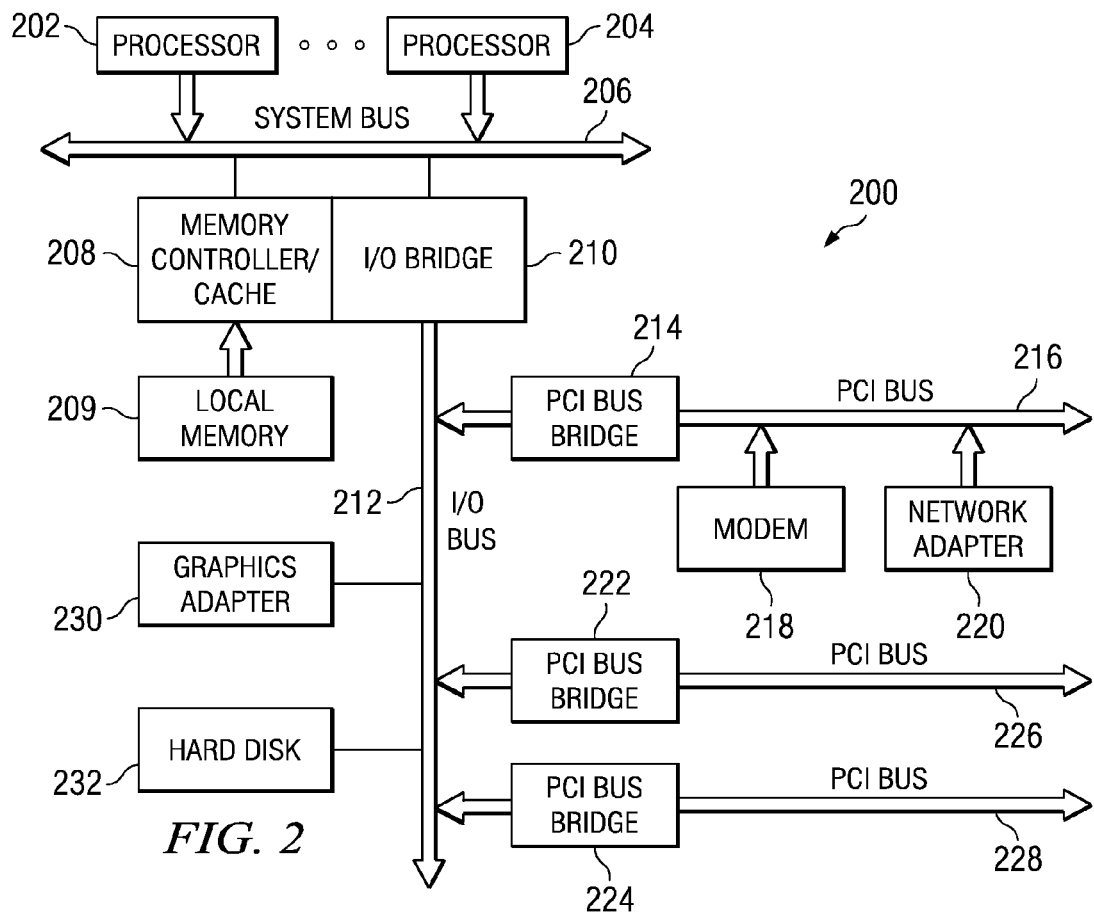
FIG. 2 is an exemplary diagram of a multicore data processing device in which exemplary aspects of the illustrative embodiments may be implemented.

The illustrative embodiments provide a system and method for multicore communication processing. As such, the mechanisms of the illustrative embodiments are preferably implemented in multicore or multi-processor data processing devices that communicate with one another via one or more data networks in a distributed data processing system. Thus, in order to provide a context for understanding an exemplary environment in which the mechanisms of the illustrative embodiments may be implemented, FIGS. 1-2 are provided hereafter as examples of a distributed data processing system and a multicore or multi-processor data processing device. The figures thereafter are directed to the specific mechanisms of the illustrative embodiments that may be implemented in this exemplary environment. It should be appreciated that FIGS. 1-2 are not intended to state or imply any limitation as to the types or configurations of data processing environments in which the illustrative embodiments may be implemented and are only intended to be exemplary. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which embodiments of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is an exemplary block diagram of a data processing device in which aspects of the present invention may be implemented. The exemplary data processing device shown in FIG. 2 is an example of one type of multicore or multi-processor data processing device however, the present invention is not limited to such, as will be readily apparent to those of ordinary skill in the art upon reading the following description. Rather, the mechanisms of the illustrative embodiments are applicable to any multicore or multi-processor data processing device. Other multicore or multi-processor data processing devices may have significantly different architectures than that shown in FIG. 2 but nevertheless, are considered to be within the spirit and scope of the present invention which is not limited to any one multicore or multi-processor architecture.

FIG. 2 is a more detailed block diagram of an symmetric multiprocessor (SMP) data processing device which may be implemented as either the server or client computing device depicted by FIG. 1 in accordance with the illustrative embodiments. While a SMP data processing device is described herein, it should be appreciated that the mechanisms of the illustrative embodiments may be utilized with heterogeneous multicore or multi-processor data processing devices in which different processing cores execute different sets of instructions, without departing from the spirit and scope of the present invention. For example, the mechanisms of the illustrative embodiments may be implemented in a heterogeneous multiprocessor system-on-a-chip, such as the Cell Broadband Engine (CBE) available from International Business Machines Corporation or Armonk, N.Y.

With reference to FIG. 2, the data processing device 200 includes a plurality of processors 202 and 204 connected to system bus 206. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing device 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing device depicted in FIG. 2 may be, for example, an IBM RISC/System 6000 system, a product of International Business Machines Corporation in Armonk, N.Y., running the Advanced Interactive Executive (AIX) operating system. Of course, other data processing devices running other operating systems may be utilized instead of that shown in FIG. 2 so long as they implement one or more of the mechanisms of the illustrative embodiments described hereafter and as set forth in the independent claims.

The illustrative embodiments provide a system and method for multicore processing of communications between data processing devices, referred to herein as multicore scaling (MCS). With the mechanisms of the illustrative embodiments, MCS provides a set of techniques that enable sustaining media speed by distributing transmit and receive-side processing over multiple processing cores. In addition, these techniques also enable designing multi-threaded network interface controller (NIC) hardware that efficiently hides the latency of direct memory access (DMA) operations associated with data packet transfers over an input/output (I/O) bus.

MCS, in accordance with the mechanisms of the illustrative embodiments, delivers a media speed communication protocol, e.g., TCP/IP processing, by enabling parallel packet processing at two critical levels: a software level (e.g., TCP/IP stack level), and a hardware level (e.g., NIC level). The basic concept is based on the fact that a communication link carries flows (i.e. connections) that are largely independent of each other. Therefore, these flows, coming from or going to a single physical or virtual port, can be processed in parallel on multiple processing cores. At the NIC level, multithreading allows packets belonging to different flows to be concurrently processed by different hardware threads.

Figure 3:
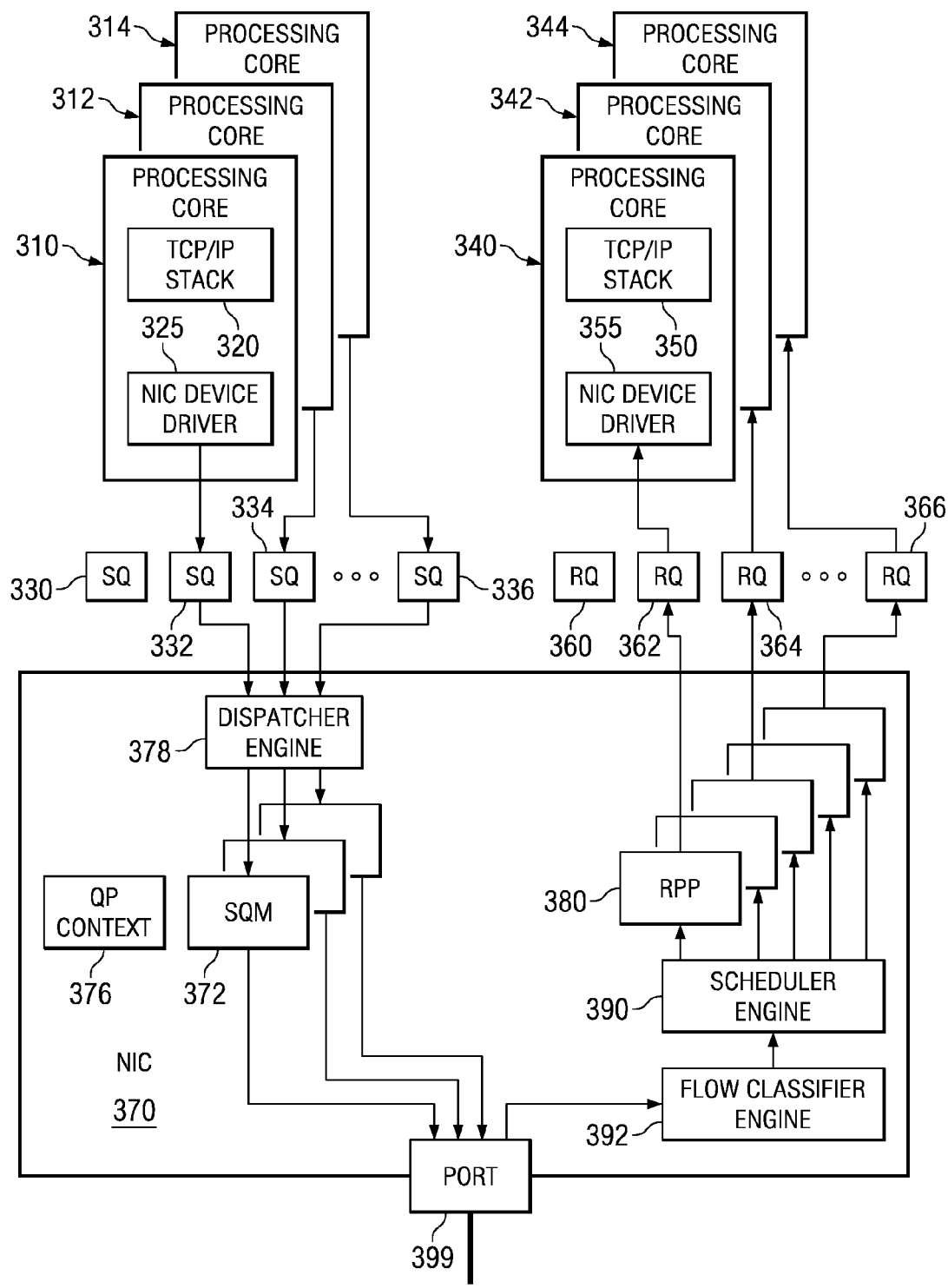
FIG. 3 is an exemplary block diagram illustrating exemplary hardware and software elements of a MCS implementation in accordance with one illustrative embodiment.

FIG. 3 is an exemplary block diagram illustrating exemplary hardware and software elements of a MCS implementation in accordance with one illustrative embodiment. As shown in FIG. 3, a plurality of processing cores 310-314 and 340-344 are provided in the multicore data processing device, each processing core 310-314 and 340-344 executing a separate instance of a communication protocol stack 320, 350, which in the depicted example is a TCP/IP stack. In addition, each processing core 310-314 and 340-344 executes a separate instance (thread of execution) of the network interface card (NIC) device driver 325, 355 in which aspects of the illustrative embodiments may be implemented. It should be appreciated that while the illustrative embodiment shown in FIG. 3 depicts the software aspects of the illustrative embodiment being implemented in a separate NIC device driver 325, 355, in other illustrative embodiments, the software aspects of the illustrative embodiments may be implemented as part of the communication protocol stack 320, 350.

The NIC device drivers 325, 355 operate to interface with send queues (SQs) 330-336 and receive queues (RQs) 360-366 through which data packets are sent to or received from the NIC 370. The SQs 330-336 and RQs 360-366 may be data structures maintained in a memory or other storage, e.g., in system memory, accessible by the processing cores 310-314, 340-344 and NIC 370. The SQs 330-336 and RQs 360-366 are typically assigned to one or more processing cores 310-314 and 340-344 as queue pairs (QPs) consisting of one send queue and one receive queue. For example, the QPs may be assigned and maintained in accordance with the InfiniBand specification, which is generally known in the art and is available from the InfiniBand Trade Association at www.infinibandta.org/specs/. Moreover, the use of QPs is further described in commonly assigned U.S. Pat. No. 6,721,806 issued to Boyd et al. on Apr. 13, 2004 and U.S. Pat. No. 7,010,633 issued to Arndt et al. on Mar. 7, 2006, for example.

The NIC 370 may be any type of network interface or adapter through which communication with one or more data networks is made available. The NIC 370 need not be a separate "card" but may be any device, whether separate from or integrated with the host system, through which data packets may be sent and/or received. The NIC 370 includes one or more send queue manager (SQM) engines 372, a queue pair (QP) context storage 376, a dispatcher engine 378, one or more receive packet processor (RPP) engines 380, a scheduler engine 390, a flow classifier engine 392, and one or more ports 399.

The SQMs 372 are hardware elements that process packets submitted to associated send queues 330-336 for transmission by the NIC 370 via the port 399. The processing cores of the host system place packets into associated send queues 330-336 from which the SQMs 372 process the data packets, using direct memory access (DMA) operations, and transmit the data packets via an associated physical or virtual port 399. The dispatcher engine 378, at particular times, selects a SQM 372 to handle the data flow from a particular send queue 330-336. The dispatcher engine 378 further ensures that only one SQM handles the data flow from a particular send queue 330-336 at a time such that two SQMs 372 cannot service data flows from the same send queue 330-336 at the same time.

The RPPs 380 are hardware implemented engines that operate in parallel with each other to process data packets received via an associated physical or virtual port 399. The RPPs 380 work in concert with the hardware implemented flow classifier engine 392 that operates to separate out data flows arriving via the same physical or virtual port 399. Based on the classification performed by the flow classifier engine 392, a receive queue 360-366 is selected. At any given time, the scheduler engine 390 may choose an RPP 380 to be used with a given receive queue 360-366 and the scheduler engine 390 will then make sure that there are no two RPPs 380 working on the same receive queue 360-366 at the same time. The data packets are then provided to the chosen RPP 380 which will process the packets for the selected receive queue 360-366. Either an interrupt or polling technique may be used to inform a processing core 340-344 associated with the receive queue 360-366 that a new data packet has arrived for processing.

Optionally, a scheduler engine 390 may be provided for selecting which RPP 380 is to process a received data packet. With such an implementation, the flow classifier engine 392 may determine which receive queue 360-366 is to receive the data packet. This selection of a receive queue 360-366 may be provided to the scheduler engine 390 which then selects a RPP 380, based on the availability of the RPPs 380, i.e. the current workload of the RPPs 380, to process the received data packet. Thus, multiple RPPs 380 may process data packets directed to the same receive queue 360-366, but not at the same time. It is the role of the scheduler engine 390 to ensure that only one RPP 380 is processing data packets for a particular receive queue 360-366 at a time.

The QP context storage 376 stores queue pair context information that may be utilized by the SQMs 372, the dispatcher engine 378, the flow classifier engine 392, the scheduler engine 390, and the RPPs 380 to determine the routing of data packets from the send queues 330-336 and to the receive queues 360-366. This QP context information may include, for example, structural information about the QPs themselves, e.g., pointers, links, configuration parameters, etc., information used to manage the receive memory where the received data packets are to be placed, error detection register information, and software interface register information, e.g., doorbell registers and the like. In the InfiniBand specification, the QP context includes approximately 40 fields of information, which will not be described in detail herein.

It should be noted that while FIG. 3 shows a single port 399 to which, and from which, data packets are sent/received, the illustrative embodiments are not limited to such. Rather, the SQMs 372, the dispatcher engine 378, the flow classifier engine 392, scheduler engine 390, and RPPs 380 may operate on data packets sent to/received from multiple ports without departing from the spirit and scope of the present invention. Moreover, as touched upon above, these ports 399 may be implemented as physical and/or virtual ports.

It should further be noted that while FIG. 3 illustrates separate processing cores 310-314 for handling the transmit or send side processing of data packets and separate processing cores 340-344 for handling the receive-side processing of data packets, the illustrative embodiments are not limited to such. Rather, the same processing cores may perform both transmit or send side processing and receive-side processing of data packets without departing from the spirit and scope of the present invention. The separate processing cores 310-314 and 340-344 are provided in FIG. 3 only for ease of illustrating the flow of data for transmit or send side processing and receive-side processing in accordance with the illustrative embodiments.

In one illustrative embodiment, the NIC device driver 325 and the TCP/IP stack 320 are software processes executing on the processing cores 310-314 and 340-344 whose purpose is to handle send queue 330-336 and receive queue 360-366 utilization for transmitting and receiving data packets. This software operates at the communication protocol stack level, i.e. the TCP/IP stack 320 level, and may be implemented either as part of the communication protocol stack or as a separate device driver, as illustrated. It should be appreciated that, rather than implementing these processes in software, dedicated hardware devices may be provided in association with each processing core 310-314 and 340-344 for performing the same operations described hereafter as being attributable to these software processes 320 and 325. Moreover, a combination of hardware and software elements may be utilized to perform these operations of the software processes 320 and 325.

In accordance with one illustrative embodiment, on the transmit or send side processing, the TCP/IP stack 320 operates in a manner generally known in the art with little if any modification. However, the NIC device driver 325 operates to select a send queue 330-336 to which data packets are to be sent and queues the data packets in the selected send queue 330-336. The NIC device driver 325 may then set a doorbell associated with the send queue, such as in the QP context storage 376, to thereby notify the NIC 370 that the data packet is ready to be sent from the selected send queue 330-336. A SQM 372 is selected by the dispatcher engine 378 which ensures that no two SQMs 372 will work on the same send queue at a given time. The selected SQM 372 then processes the data packet in the selected send queue 330-336 using DMA operations and transmits the data packet via the port 399.

On the receive-side processing, the NIC device driver 355 may operate in response to the generation of an interrupt by, for example, a RPP 380, indicating receipt of a data packet in a receive queue 360-366 and may serve to deliver the received data packet to the communication protocol stack, e.g., the TCP/IP stack 350, for processing. The NIC device driver 355, during receive-side processing, may operate based on an interrupt or polling technique, depending upon the particular desired implementation.

Both the send and receive-side processing performed by the software mechanisms may be performed in parallel with each other and with other send and receive-side processing performed by other instances of the software running on other processing cores 310-314 and 340-344. That is, the NIC device driver 325 and TCP/IP stack 320 in processing core 310 may operate to both send and receive data packets virtually simultaneously, thereby increasing the throughput and processing ability of the processing core 310 with regard to data communications. Moreover, the NIC device driver 325 and TCP/IP stack 320 of processing core 310 may send and receive data packets virtually simultaneously with the TCP/IP stack and NIC device driver instances 350 and 355 of processing core 340.

Locks are not required for such processing except in the instance that the TCP/IP stack needs to access a send queue 330-336 since multiple TCP/IP instances 320, 350 may work on connections that are part of the same data flow. That is, locks are only required if two TCP/IP stacks have to access the same SQ 330-336.

The transmit or send side processing of data packets and receive-side processing of data packets in accordance with the illustrative embodiments will now be described in more detail with reference to FIGS. 4-7. The description of the transmit or send side processing and receive-side processing of data packets will be described in terms of TCP/IP stack processing, but is not limited to such. Rather, the mechanisms of the illustrative embodiments may be utilized with any data communication protocol without departing from the spirit and scope of the present invention.

Figure 4:
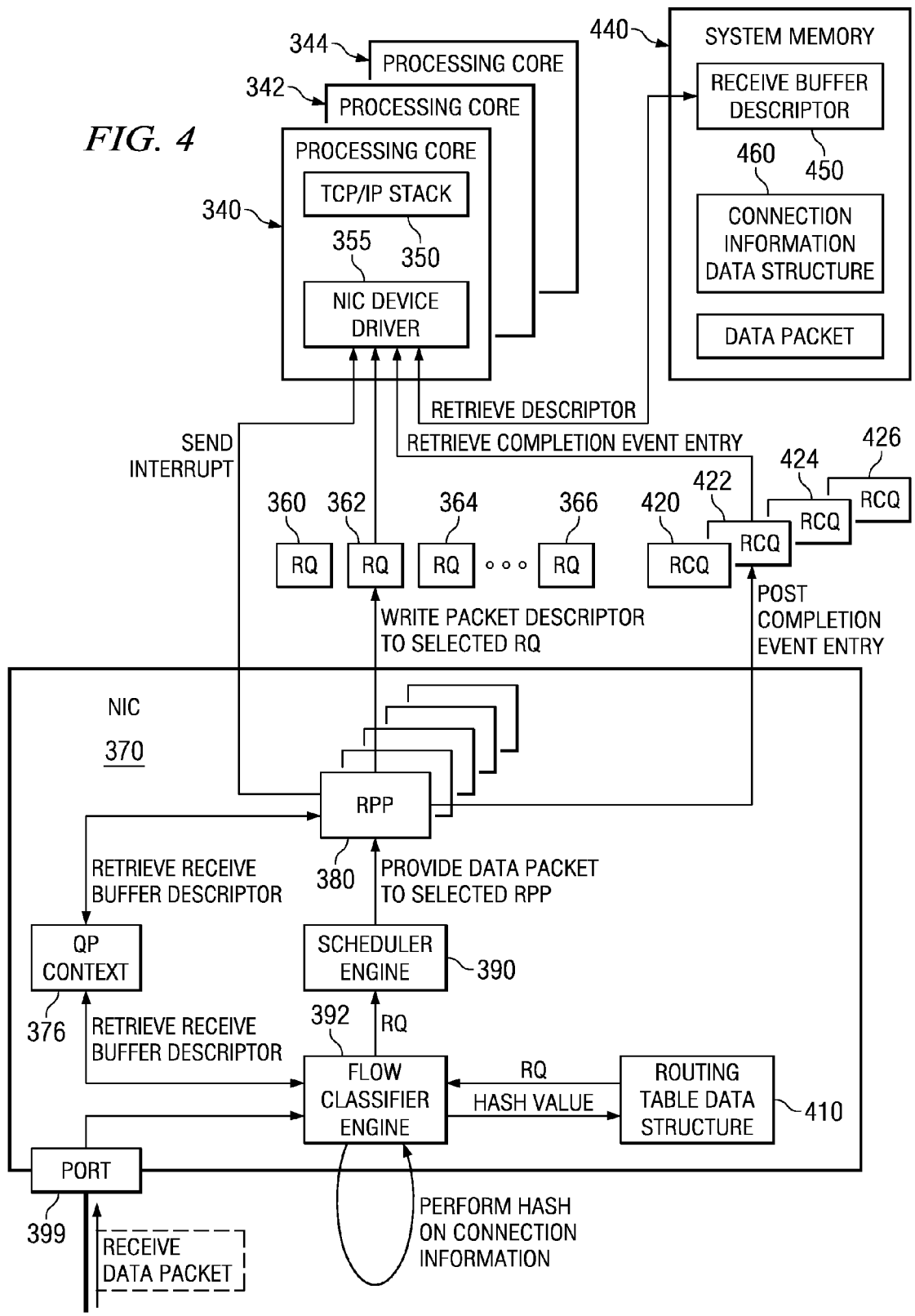
FIG. 4 is an exemplary block diagram illustrating receive-side processing of data packets in accordance with one illustrative embodiment.

FIG. 4 is an exemplary block diagram illustrating receive-side processing of data packets in accordance with one illustrative embodiment. As shown in FIG. 4, when a data packet arrives via the port 399, the data packet is provided to the hardware implemented flow classifier engine 392. The flow classifier engine 392 parses header information in the received data packet and checks to determine the communication protocol, e.g., TCP, UDP, IPv4, IPv6, etc., used by the data packet. This information informs the flow classifier engine 392 of the format of the header information so that the required information for determining routing of the data packet to an appropriate receive queue 360-366 may be extracted. The determination of the communication protocol may be made based on a predefined field of the header information in the data packet which identifies the communication protocol associated with the data packet.

Having determined the communication protocol used, the flow classifier engine 392 extracts header information, e.g., 6 tuples, from the data packet including, for example, the IP destination address, the IP source address, the destination port, the source port, the protocol port, the virtual port, etc. Based on this information, the flow classifier engine 392 accesses the QP context storage 376, or alternatively, a connection lookup operation is performed which may require accessing a connection information data structure 460 in system memory 440, and determines if a receive queue 360-366 has been specifically associated with this data flow at connection establishment time. The connection information data structure 460 contains entries that describe all allocated connections, such as in a tree structure for example, which may be used to lookup a QP identifier, if it exists, for given connection search data. Alternatively, information may be stored in the QP context storage 376 which identifies which receive queue 360-366 is associated with a particular connection.

Essentially, the QP context or connection lookup operation is performed on a hash of specific connection information extracted from the data packet header and returns a QP identifier if one exists for the connection corresponding to the hash value, thereby identifying a receive queue 360-366 for the connection. If a particular receive queue 360-366 has been specifically associated with this data flow at connection establishment time, then this receive queue, e.g., RQ 362, is selected by the flow classifier engine 392 to which the data packet is to be routed.

If a receive queue 360-366 has not been specifically associated with this data flow, the flow classifier engine 392 performs a hash operation on the extracted header information, e.g., the 6 tuples, and the resulting hash value is used to select a receive queue 360-366 for routing the data packet. For example, the hash value may be used as an index into a routing table data structure 410 which identifies the address of the storage location corresponding to a receive queue 360-366 to which the data packet is to be routed.

The identification of the receive queue 360-366 by the flow classifier engine 392 results in a receive queue identifier being provided to an optional scheduler engine 390. If the optional scheduler engine 390 is not utilized, the flow classifier engine 392 may provide the data packet to a specific receive packet processor (RPP) 380. The optional scheduler engine 390 may be utilized in implementations in which multiple RPPs 380 may service the same receive queue, for example, to ensure that only one RPP works on a particular receive queue at a given time. The optional scheduler engine 390 may select between multiple RPPs 380 that may service the identified receive queue 360-366 based on a current loading of the RPPs 380 and then associate the selected RPP 380 with data flows to the selected receive queue. The optional scheduler engine 390 is only provided to further increase the processing speed of data packets and is not necessary to the operation of the illustrative embodiments.

The data packet is posted, via the flow classification performed by the flow classifier engine 392 to select a particular receive queue 360-366 and the selection of a RPP 380 by either the optional scheduler engine 390 or the flow classifier engine 392, depending upon the implementation, to a selected receive queue 360-366 by a selected RPP 380. The posting of the data packet may be performed by using the information present in a receive buffer descriptor found in the selected receive queue 360-366. For example, this receive buffer descriptor may contain the addresses of where to DMA the data packet in system memory 440. The selected RPP 380 may then post a completion event entry in a receive completion queue (RCQ) 420-426 associated with the selected receive queue 360-366. For example, this completion event entry may contain the length of the received data packet.

In one illustrative embodiment, each receive queue 360-366 is associated, on a one-to-one basis, with a receive completion queue 420-426. The completion event entry identifies the selected receive queue 360-366 in which a new data packet is available for processing as well as the number of data packets to in the selected receive queue 360-366 to be processed.

An interrupt is associated with one or more receive completion queues 420-426. One interrupt is associated with a unique processing core 340-344 or to a set of processing cores 340-344. All receive completion queues 420-426 associated with the same interrupt are processed by the same processing core 340-344 or same set of processing cores 340-344. To maximize cache affinity, the same data flow may always be processed by the same processing core 340-344 or set of processing cores 340-344.

The RPP 380, in addition to posting the completion event entry to the receive completion queue 420-426, may trigger an interrupt to the processing core 340-344 associated with the receive completion queue 420-426. The interrupt informs the processing core 340-344 that a new receive completion queue completion event entry is available for processing. The interrupt triggers the NIC device driver 355 which delivers the data packet information (e.g. address in memory, length, etc.) of the received data packet to the associated TCP/IP stack 350. Multiple interrupts targeting different processing cores 340-344 may be raised concurrently by the RPPs 380. These interrupts, therefore, trigger concurrent execution of the NIC device driver instances 355 on each processing core 340-344. Each instance of the NIC device driver 355 may process completion event entries of different receive completion queues 420-426. Each NIC device driver instance 355 may then dispatch a different TCP/IP stack instance 350. Therefore, each TCP/IP stack instance may operation on a different set of TCP connections as identified by the flow classifier engine 392.

Alternatively, a polling operation may be utilized instead of an interrupt operation. In such an illustrative embodiment, multiple TCP/IP user space threads may run concurrently on different processing cores 340-344. Each thread may poll the set of receive completion queues 420-426 associated with that particular processing core 340-344 on which the thread executes. If the thread identifies a new completion event entry for processing, the NIC device driver instance 355 associated with that processing core 340-344 is informed of the new completion event entry which it then processes accordingly.

The NIC device driver 355 may operate just above the media access control (MAC) layer of the TCP/IP stack 350, i.e. between the data link layer and the network layer of the TCP/IP stack 350, and thus, may provide a retrieved receive completion queue completion event entry to the network layer of the TCP/IP stack 350 for processing. Based on the completion event entry, the TCP/IP stack 350 may retrieve and process the associated data packet from the associated receive queue 360-366.

It should be appreciated from the above that, regardless of the implementation selected, i.e. either interrupt or polling implementation, there is no locking requirement for locking the receive queue, receive completion queue, or other resources utilized during the receive-side processing, in either the NIC device driver 355 or in the TCP/IP stack 350. Since there is no locking requirement, resources are not locked until processing of a data packet is completed and thus, concurrent processing of data packets by multiple instances of the NIC device driver 355 and the TCP/IP stack 350 instances is made possible.

Figure 5:
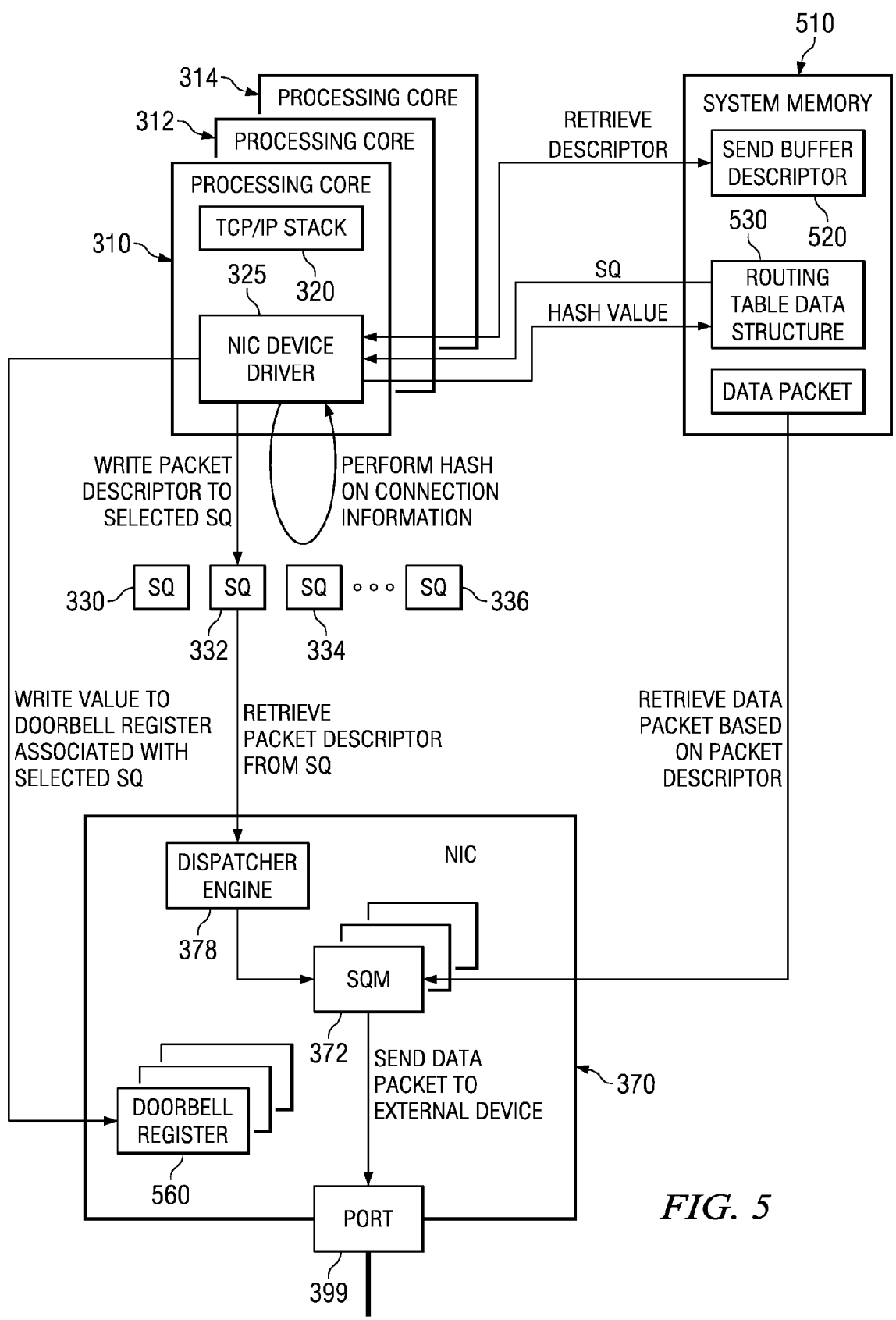
FIG. 5 is an exemplary block diagram illustrating transmit or send side processing of data packets in accordance with one illustrative embodiment.

FIG. 5 is an exemplary block diagram illustrating transmit or send side processing of data packets in accordance with one illustrative embodiment. As shown in FIG. 5, when a data packet is to be sent from a processing core 310-314 out over one or more data networks via a NIC 370, the TCP/IP stack 320, or the NIC device driver 325 depending upon whether the operations of the NIC device driver 325 are integrated into the TCP/IP stack 320, selects a send queue 330-336 for posting of the data packet for transmission. It will be assumed for purposes of the illustrated embodiment, that the operations of the NIC device driver 325 have not been integrated into the TCP/IP stack 320 and thus, the TCP/IP stack 320 is essentially the same as in known systems.

The selection of the send queue 330-336 may be performed based on a pre-allocated send queue 330-336 for the data flow of which the data packet is a part or based on a hash of connection information provided in the header of the data packet. For example, the NIC device driver 325 may have received information from the communication stack that this data flow already has an allocated send queue (under the form of an send queue index, for example). If a send queue has been allocated for the data flow, the NIC device driver 325 selects that send queue as the one to which the data packet is to be routed.

If a send queue has not been allocated for the data flows, the NIC device driver 325 performs a hash operation on the connection information of the data packet header, e.g., the IP destination address, IP source address, destination port, source port, and protocol port. It should be noted that this hash operation need not be the same hash operation as performed on the receive-side processing described previously. That is, two different hash functions may be utilized and two different hash operations may be performed for transmit or send side processing and receive-side processing. It should be noted that the particular hash function to be used in both the transmit or send side processing and the receive-side processing, as well as what connection information the hash operation is performed on, may be programmed into the flow classifier engine 392 and the NIC device driver 325 such that it may be changed or modified when deemed necessary.

Once the send queue selection is performed by the NIC device driver 325, the NIC device driver 325 queues the data packet in the selected send queue 330-336. It queues the data packet in the selected send queue 330-336 by writing a send buffer descriptor into the selected send queue, e.g., send queue 332. The send buffer descriptor contains the addresses and lengths of the data packet in system memory 510. The information in the send buffer descriptor is used by the NIC 370 to perform DMA read operations of the data packet headers and payload.

The NIC device driver 325 then "rings the doorbell" associated with the selected send queue to notify the NIC that a data packet is read to be sent. Essentially, a value is written to a doorbell register 560 in the NIC 370 associated with the selected send queue 332. This value informs the NIC that there is a send buffer descriptor for a data packet available for processing in a send queue associated with the doorbell register 560.

In response to the writing of a value to this doorbell register 560, the dispatcher engine 378 wakes up a selected send queue manager engine (SQM) 372 to process the data packet for the selected send queue 332. The SQM 372 performs DMA operations to thereby DMA the send buffer descriptor at the head of the selected send queue 332 associated with the doorbell register 560. The SQM 372 then DMAs the data packet from system memory 510 using the address and length parameters found in the send buffer descriptor.

It should be noted that the send side processing may be performed concurrently on different send queues 330-336. Moreover, the send side processing may be performed concurrently on different processing cores 310-314. In addition, the SQMs 372 may operate on different send queues 330-336 concurrently. Having multiple SQMs 372 running in parallel allows the NIC 370 to hide the latency associated with DMA operations to system memory 510. In this way, transmission of consecutive data packets may be enabled with a zero inter-packet gap on the data network media.

Figure 6A:
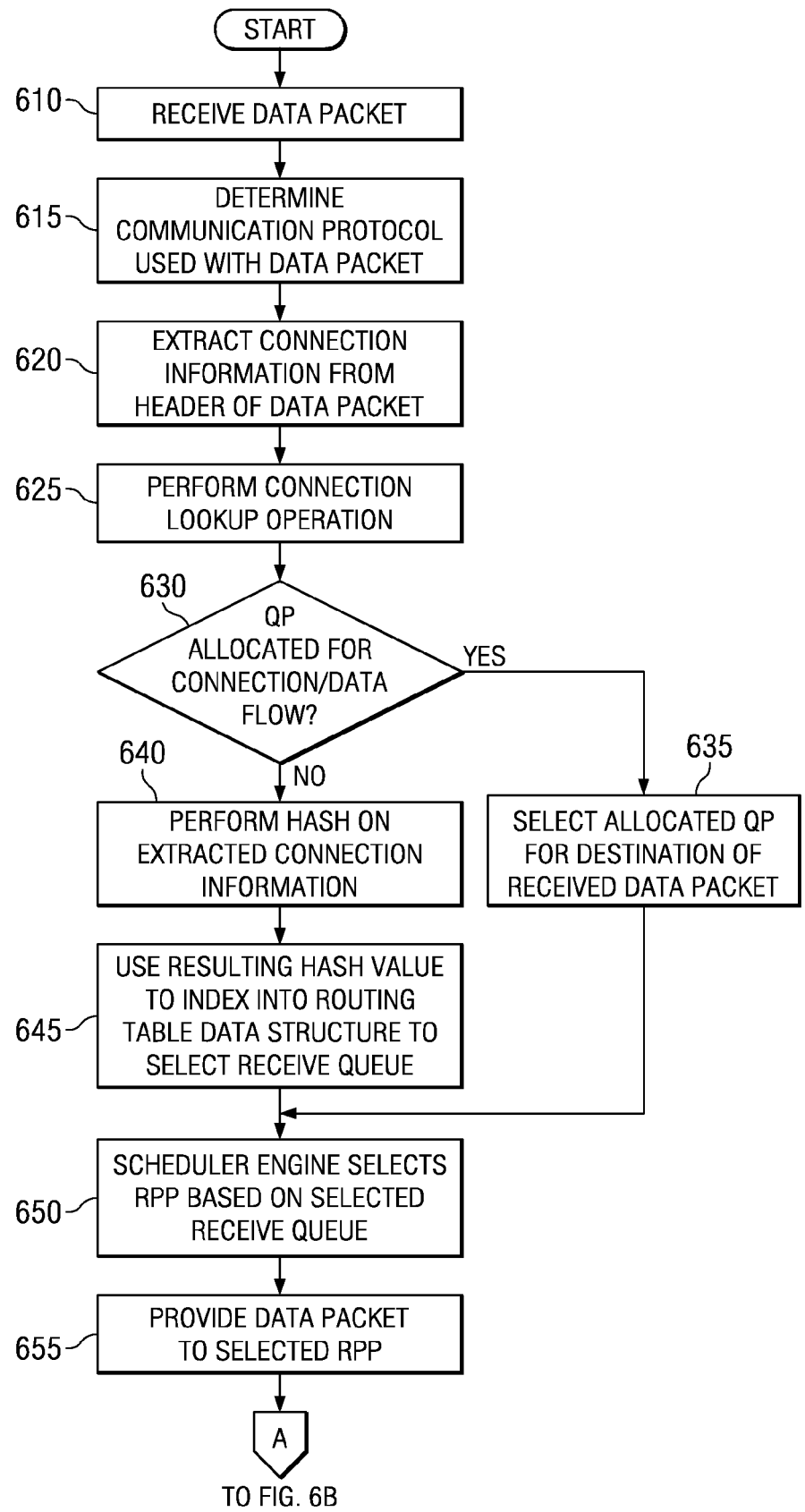
FIGS. 6A and 6B are a flowchart outlining an exemplary operation for receiving data packets in accordance with one illustrative embodiment.
Figure 6B:
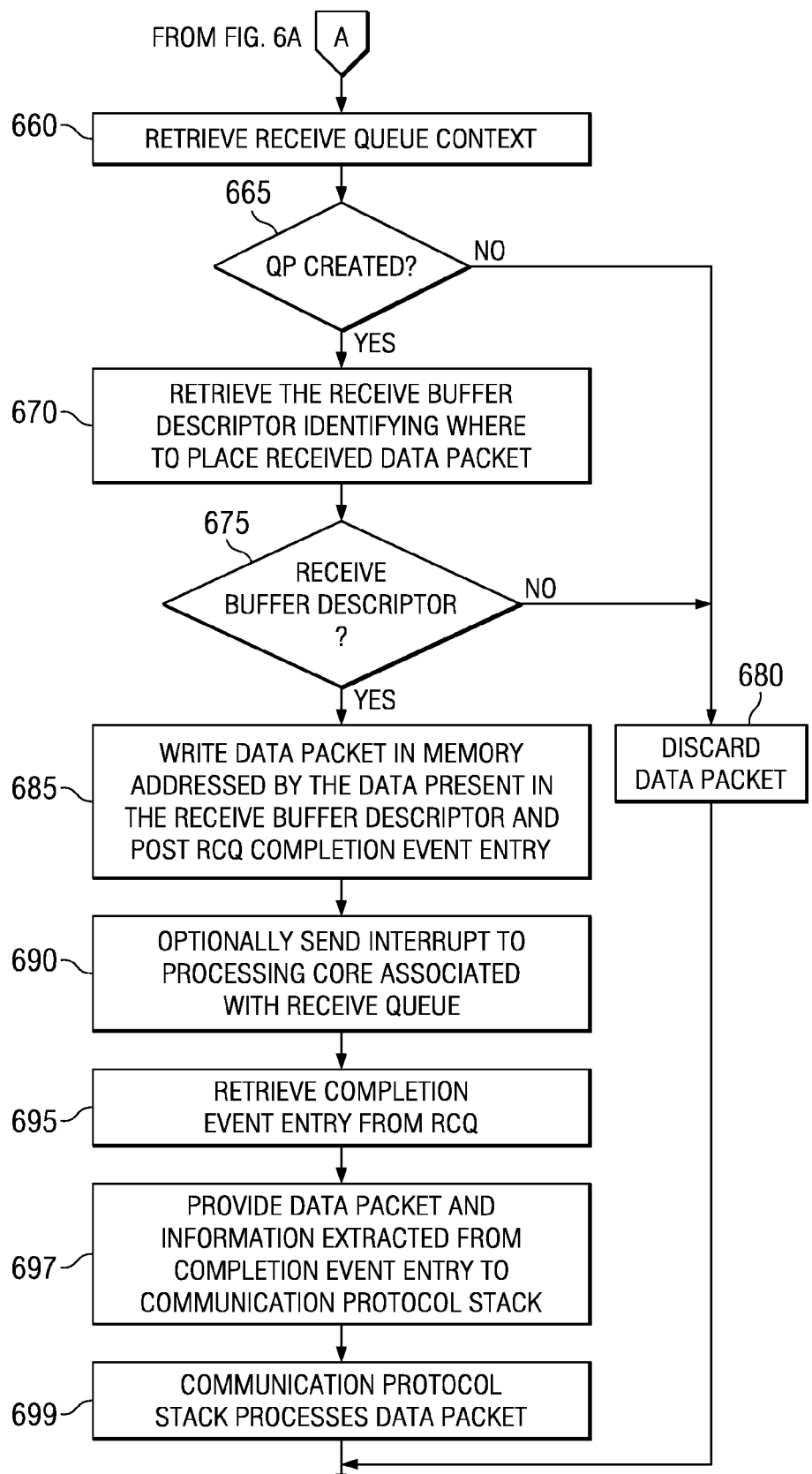

FIGS. 6A, 6B, and 7 are flowcharts that illustrate transmit and receive operations according to one illustrative embodiment. It will be understood that each block of the flowchart illustrations, and combinations of blocks in the flowchart illustrations, may be implemented in hardware or by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

FIGS. 6A and 6B are a flowchart outlining an exemplary operation for receiving data packets in accordance with one illustrative embodiment. As shown in FIGS. 6A and 6B, the operation starts with the receipt of a data packet via a physical and/or virtual port of a network interface card (NIC) or other data network adapter (step 610). A flow classifier engine of the NIC or adapter determines the communication protocol associated with the data packet (step 615). Based on the determined communication protocol, the flow classifier engine extracts connection information from a header of the data packet (step 620). The flow classifier engine then performs a connection lookup operation to identify a QP for the connection corresponding to the data packet (step 625) and determines, based on the extracted connection information and the connection lookup operation performed, whether a receive queue has been allocated to the data flow of which the data packet is a part (step 630). If so, the flow classifier engine selects the receive queue allocated to the data flow as the receive queue to which the data packet is to be routed (step 635) and the scheduler engine selects a RPP based on the selected receive queue (step 650).

If a receive queue has not been allocated to the data flow, the flow classifier engine performs a hash operation on the connection information extracted from the header of the data packet (step 640). The resulting hash value is then used by the flow classifier engine to index into a routing table data structure which identifies a receive queue to which the data packet is to be routed (step 645).

The flow classifier engine, or an optional scheduler engine if included, selects a receive packet processor (RPP) for processing of the data packet for the selected receive queue (step 650). If a scheduler engine is used, it will ensure that the same receive queue is not dispatched to two different RPP at the same time. The flow classifier engine or scheduler engine then provides the data packet to the selected RPP for processing (step 655).

The selected RPP reads the receive queue context from system memory (step 660). If the receive queue was not created or is in a state that does not allow the reception of a data packet (step 665), then the data packet is discarded (step 680) and the operation ends. Otherwise, the RPP retrieves a next receive buffer descriptor of the receive queue from system memory (step 670). If there is no such receive buffer descriptor (step 675), the data packet is discarded (step 680) and the process ends. Otherwise, the RPP places the data packet in the selected receive queue by using the information present in the receive buffer descriptor (containing the system memory addresses where to perform the DMA) and posts a completion event entry (writing the data packet length for example) to a receive completion queue associated with the selected receive queue (step 685).

Thereafter, assuming that an interrupt based implementation is being utilized, the RPP may send an interrupt to the processing core(s) associated with the receive completion queue to which the completion event entry was posted (step 690). The NIC device driver of the processing core(s), in response to receiving the interrupt, retrieves the completion event entry from the receive completion queue (step 695) and provide the completion event entry information and data packet to the communication protocol stack instance associated with the NIC device driver (step 697). The communication protocol stack instance then processes the data packet based on the completion event entry (e.g. data packet length) and some information retrieved from the receive buffer descriptor (e.g. address in memory, error were detected in the hardware, etc.) in the receive queue (step 699). The operation then terminates.

It should be appreciated that the operation outlined in FIGS. 6A and 6B is for a single data packet. This operation may be performed multiple times concurrently with a plurality of different data packets of the same or different data flows. Thus, the outlined operation may be performed in parallel with other similar operations on the same or different NICs, network adapters, and processing cores.

FIG. 7 is a flowchart outlining an exemplary operation for transmitting or sending data packets in accordance with one illustrative embodiment. As shown in FIG. 7, the transmit or send operation starts with a processing core generating a data packet for transmission (step 710). When the communication protocol stack passes the data packet to the device driver, it may give an indication that it wishes to use a particular send queue (e.g., by providing a send queue index). If such is the case (step 715), the specified send queue is selected for use in transmitting the data packet and the device driver process continues at step 735. Otherwise, the device driver extracts connection information from a header of the data packet (step 720). The device driver performs a hash operation on the extracted connection information (step 725) and uses the resulting hash value to index into a routing table data structure to identify a send queue for use in transmitting the data packet (step 730).

Once a send queue has been identified (either explicitly by the communication protocol stack or through the hashing mechanism described above), the device driver next verifies that the send queue has been created (step 735). If the send queue has not been created, the data packet is discarded (step 740) and the operation ends. If the send queue has been created, the device driver creates a send buffer descriptor associated with the data packet (step 745). Thereafter, the device driver queues the data packet in the selected send queue by writing the send buffer descriptor to the send queue and then writing a value to a doorbell register of a network adapter, the doorbell register corresponding to the selected send queue (step 750). In response to detecting the value in the doorbell register, the network adapter dispatches a send queue manager to process the data packet for the selected send queue, making sure that no two SQMs are processing the same send queue at the same time (step 755). The send queue manager DMA's the send buffer descriptor at the head of the send queue (step 760) and, based on the address and length information stored in the send buffer descriptor, DMA's the data packet from system memory (step 765). The operation then terminates after the data packet is transmitted on the line (step 770).

It should be appreciated that the operation outlined in FIG. 7 is for a single data packet. This operation may be performed multiple times concurrently with a plurality of different data packets of the same or different data flows. Thus, the outlined operation may be performed in parallel with other similar operations on the same or different processing cores, NICs, and network adapters.

Thus, the MCS mechanisms of the illustrative embodiments provide high performance by enabling concurrent processing on both the transmit and receive sides of a communication flow. Moreover, the MCS mechanisms enable high performance by enabling concurrent processing on NIC and processing cores. Furthermore, the MCS mechanisms enable high performance by creating an affinity between flows and processor caches. All of these benefits make the MCS mechanisms of the illustrative embodiments well suited for high speed media applications, including high speed media bandwidths of 10 Gbps and above, such that full communication link capacity may be utilized.

It should be appreciated that the illustrative embodiments may take the form of an entirely hardware embodiment (in both the NIC and the processing cores) or an embodiment containing both hardware (in the NIC) and software elements (running in the processing cores). In one exemplary embodiment, the mechanisms of the illustrative embodiments are implemented in software, which includes but is not limited to firmware, resident software, microcode, etc. in the processing cores and hardware engines provided in the NIC.

Furthermore, the aspects of the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a network adapter coupled to a host system, for transmitting a data packet, the host system comprising at least one processing core and a plurality of send queues, and the network adapter comprising a plurality of send queue managers, the method comprising:

generating, in a processing core of the at least one processing core, a data packet for transmission to an external device that is external to the host system and the network adapter;

selecting a send queue from the plurality of send queues, based on connection information extracted from a header of the data packet;

generating an entry in the selected send queue for the data packet;

processing, by a send queue manager of the plurality of send queue managers, the entry in the selected send queue; and transmitting the data packet from the host system to the external device via the network adapter, wherein each send queue manager of the plurality of send queue managers in the network adapter is associated with a different send queue in the plurality of send queues in the host system, and wherein the plurality of send queue managers are hardware implemented.

2. The method of claim 1, wherein the at least one processing core is one of a plurality of processing cores, and wherein the method is implemented with regard to each of the plurality of processing cores in a parallel manner.

3. The method of claim 1, wherein selecting a send queue comprises:

retrieving send buffer descriptor information from system memory;

determining, based on the connection information and the send buffer descriptor information, whether a send queue has been previously allocated for a connection associated with the data packet; and selecting the previously allocated send queue if a send queue has been previously allocated for the connection.

4. The method of claim 3, wherein if a send queue has not been previously allocated for the connection, the method comprises:

performing a hash operation on the connection information to generate a hash value;

indexing into a routing table data structure based on the generated hash value; and selecting a send queue based on a value of an entry stored in the routing table data structure associated with the hash value.

5. The method of claim 1, wherein selecting a send queue and generating an entry in the selected send queue for the data packet are performed by software executing on the at least one processing core.

6. The method of claim 5, wherein the software is a network interface device driver separate from a communication protocol stack.

7. The method of claim 5, wherein the software is a portion of a communication protocol stack.

8. The method of claim 1, further comprising:

receiving an incoming data packet in a network interface of the data processing system;

processing the incoming data packet using a hardware implemented data flow classifier engine to select a receive queue in which to place the incoming data packet; and placing, by a hardware implemented receive packet processor, the incoming data packet in a selected receive queue based on the selection performed by the hardware implemented data flow classifier engine.

9. The method of claim 8, wherein the data flow classifier engine selects a receive queue by:

determining if a receive queue for a connection over which the incoming data packet was received has been previously allocated; and selecting the previously allocated receive queue if a receive queue has been previously allocated for the connection.

10. The method of claim 9, wherein if a receive queue for the connection has not been previously allocated, the data flow classifier engine:

extracts connection information from the incoming data packet;

performs a hash operation on the extracted connection information to generate a hash value; and indexes into a routing table to select a receive queue to which the incoming data packet is to be routed based on the generated hash value.

11. The method of claim 8, wherein the hardware implemented receive packet processor is one of a plurality of hardware implemented receive packet processors, and wherein the hardware implemented receive packet processor is selected from the plurality of hardware implemented receive packet processors by a scheduler engine based on an availability of hardware implemented receive packet processors in the plurality of hardware implemented receive packet processors.

12. The method of claim 8, further comprising:

sending an interrupt to a processing core associated with the selected receive queue;

posting a completion event entry in a receive completion queue associated with the selected receive queue; and processing, by a communication protocol stack, the incoming data packet placed in the selected receive queue.

13. An apparatus, comprising:

a host system comprising at least one processing core and a plurality of send queues; and a network adapter, comprising a plurality of send queue managers, coupled to the host system, wherein the at least one processing core of the at least one processing core:

generates a data packet for transmission to an external device that is external to the host system and the network adapter, selects a send queue from the plurality of send queues, based on connection information extracted from a header of the data packet, generates an entry in the selected send queue for the data packet, and wherein:

the entry in the selected send queue is processed by a send queue manager of the plurality of send queue managers, the data packet is transmitted from the host system to the external device via the network adapter, each send queue manager of the plurality of send queue managers in the network adapter is associated with a different send queue in the plurality of send queues in the host system, and the plurality of send queue managers are hardware implemented.

14. The apparatus of claim 13, wherein the at least one processing core is one of a plurality of processing cores, and wherein each of the plurality of processing cores performs one or more of the generate and select operations in a parallel manner.

15. The apparatus of claim 13, wherein the at least one processing core selects a send queue by:

retrieving send buffer descriptor information from system memory;

determining, based on the connection information and the send buffer descriptor information, whether a send queue has been previously allocated for a connection associated with the data packet; and selecting the previously allocated send queue if a send queue has been previously allocated for the connection.

16. The apparatus of claim 15, wherein if a send queue has not been previously allocated for the connection, the at least one processing core selects a send queue by:

performing a hash operation on the connection information to generate a hash value;

indexing into a routing table data structure based on the generated hash value; and selecting a send queue based on a value of an entry stored in the routing table data structure associated with the hash value.

17. The apparatus of claim 13, wherein the at least one processing core selects a send queue and generates an entry in the selected send queue for the data packet by executing software in the at least one processing core.

18. The apparatus of claim 17, wherein the software is a network interface device driver separate from a communication protocol stack.

19. The apparatus of claim 17, wherein the software is a portion of a communication protocol stack.

20. The method of claim 13, further comprising:

receives an incoming data packet in a network interface of the data processing system;

processes the incoming data packet using a hardware implemented data flow classifier engine to select a receive queue in which to place the incoming data packet; and places, by a hardware implemented receive packet processor, the incoming data packet in a selected receive queue based on the selection performed by the hardware implemented data flow classifier engine.

21. The apparatus of claim 20, wherein the data flow classifier engine selects a receive queue by:

determining if a receive queue for a connection over which the incoming data packet was received has been previously allocated; and selecting the previously allocated receive queue if a receive queue has been previously allocated for the connection.

22. The apparatus of claim 21, wherein if a receive queue for the connection has not been previously allocated, the data flow classifier engine:

extracts connection information from the incoming data packet;

performs a hash operation on the extracted connection information to generate a hash value; and indexes into a routing table to select a receive queue to which the incoming data packet is to be routed based on the generated hash value.

23. The method of claim 20, wherein the hardware implemented receive packet processor is one of a plurality of hardware implemented receive packet processors, and wherein the hardware implemented receive packet processor is selected from the plurality of hardware implemented receive packet processors by a scheduler engine based on an availability of hardware implemented receive packet processors in the plurality of hardware implemented receive packet processors.

24. The apparatus of claim 20, wherein the receive packet processor further:

sends an interrupt to a processing core associated with the selected receive queue; and posts a completion event entry in a receive completion queue associated with the selected receive queue and wherein a communication protocol stack of the at least one processing core processes the incoming data packet placed in the selected receive queue.

25. A system, comprising:

a host system having a plurality of processing cores, each processing core in the plurality of processing cores executing a communication protocol stack instance and a network interface device driver instance, the host system further having a plurality of send queues;

a network adapter coupled to the host system, the network adapter comprising:

a plurality of hardware implemented send queue managers; and a plurality of hardware implemented receive packet processors, wherein:

the plurality of hardware implemented send queue managers process data packets placed in send queues by the plurality of processing cores, each hardware implemented send queue manager is associated with a different send queue in the plurality of send queues, and the plurality of hardware implemented receive packet processors process data packets received by the network adapter via a port of the network adapter.

26. The system of claim 25, wherein each processing core in the plurality of processing cores performs the following operations, in a parallel manner, for corresponding data packets each processing core transmits to an external device:

generating the data packet for transmission to an external device;

selecting a send queue from the plurality of send queues to use for transmitting the data packet based on connection information extracted from a header of the data packet; and generating an entry in the selected send queue for the data packet.

27. The system of claim 26, wherein the network adapter processes the entry in the selected send queue by an associated hardware implemented send queue manager to thereby transmit the data packet to the external device, wherein the associated hardware implemented send queue manager is one of the plurality of hardware implemented send queue managers.

28. The system of claim 26, wherein each processing core selects a send queue to use for transmitting the data packet by:

retrieving send buffer descriptor information from system memory;

determining, based on the connection information and the send buffer descriptor information, whether a send queue has been previously allocated for a connection associated with the data packet; and selecting the previously allocated send queue if a send queue has been previously allocated for the connection.

29. The system of claim 28, wherein if a send queue has not been previously allocated for the connection, each processing core:

performs a hash operation on the connection information to generate a hash value;

indexes into a routing table data structure based on the generated hash value; and selects a send queue based on a value of an entry stored in the routing table data structure associated with the hash value.

30. The method of claim 25, further comprising:

receives an incoming data packet in a network interface of the data processing system;

processes the incoming data packet using a hardware implemented data flow classifier engine to select a receive queue in which to place the incoming data packet; and places, by a hardware implemented receive packet processor, the incoming data packet in a selected receive queue based on the selection performed by the hardware implemented data flow classifier engine.

31. The system of claim 30, wherein the data flow classifier engine selects a receive queue by:

determining if a receive queue for a connection over which the incoming data packet was received has been previously allocated; and selecting the previously allocated receive queue if a receive queue has been previously allocated for the connection.

32. The system of claim 31, wherein if a receive queue for the connection has not been previously allocated, the data flow classifier engine:

extracts connection information from the incoming data packet;

performs a hash operation on the extracted connection information to generate a hash value; and indexes into a routing table to select a receive queue to which the incoming data packet is to be routed based on the generated hash value.

33. The method of claim 31, wherein the hardware implemented receive packet processor is one of a plurality of hardware implemented receive packet processors, and wherein the hardware implemented receive packet processor is selected from the plurality of hardware implemented receive packet processors by a scheduler engine based on an availability of hardware implemented receive packet processors in the plurality of hardware implemented receive packet processors.

34. The system of claim 31, wherein the receive packet processor:

sends an interrupt to a processing core associated with the selected receive queue; and posts a completion event entry in a receive completion queue associated with the selected receive queue, and wherein a communication protocol stack instance of a corresponding processing core processes the incoming data packet placed in the selected receive queue.

35. A computer program product comprising a computer useable medium having a computer readable program, wherein the computer readable program, when executed on a computing device having a processing core and a plurality of send queues, and a network adapter having a plurality of send queue managers, causes the computing device to:

generate, in the processing core, a data packet for transmission to an external device that is external to the computing device;

select a send queue, from the plurality of send queues, based on connection information extracted from a header of the data packet;

generate an entry in the selected send queue for the data packet;

process, by a send queue manager of the plurality of send queue managers, the entry in the selected send queue; and transmit the data packet from the computing device to the external device via the network adapter, wherein each send queue manager of the plurality of send queue managers in the network adapter is associated with a different send queue in the plurality of send queues in the computing device, and wherein the plurality of send queue managers are hardware implemented.

* * * * *